(12) United States Patent
Bukurak et al.

(10) Patent No.: US 9,703,370 B2
(45) Date of Patent: Jul. 11, 2017

(54) DEVICES AND METHODS FOR DISPLAYING DATA IN RESPONSE TO DETECTED EVENTS

(71) Applicants: BlackBerry Limited, Waterloo (CA); QNX Software Systems Limited, Kanata (CA)

(72) Inventors: David Bukurak, Ottawa (CA); Dominique Simoneau-Ritchie, Ottawa (CA); Jason Robert Mawdsley, Ottawa (CA)

(73) Assignees: BlackBerry Limited, Waterloo, Ontario (CA); 2236008 Ontario Inc., Waterloo, Ontario (CA)

( * ) Notice: Subject to any disclaimer, the term of this patent is extended or adjusted under 35 U.S.C. 154(b) by 162 days.

(21) Appl. No.: 13/894,995

(22) Filed: May 15, 2013

(65) Prior Publication Data
US 2014/0240216 A1    Aug. 28, 2014

(30) Foreign Application Priority Data

Feb. 22, 2013    (EP) .................................... 13156473
Feb. 22, 2013    (EP) .................................... 13156475

(51) Int. Cl.
  *G06F 3/01*    (2006.01)
  *G06F 9/48*    (2006.01)
  (Continued)

(52) U.S. Cl.
  CPC .............. *G06F 3/01* (2013.01); *G06F 3/1423* (2013.01); *G06F 3/1454* (2013.01);
  (Continued)

(58) Field of Classification Search
  CPC ........ G06F 3/01; G06F 3/1423; G06F 3/1454; G06F 9/4856; G09G 2354/00; H04M 1/7253
  (Continued)

(56) References Cited

U.S. PATENT DOCUMENTS 8,583,090 B2 *  11/2013  Vartiainen et al. ........ 455/414.3
8,749,452 B2 *   6/2014  Hosein et al. ................ 345/2.2
(Continued)

FOREIGN PATENT DOCUMENTS

EP        2385689 A1    11/2001

OTHER PUBLICATIONS

Extended European Search Report from related European Patent Application No. 13167947.4 dated Aug. 6, 2013; 8 pages.

*Primary Examiner* — Afroza Chowdhury
(74) *Attorney, Agent, or Firm* — Jon Gibbons; Fleit Gibbons Gutman Bongini & Bianco P.L.

(57) ABSTRACT

A method and a device is disclosed, whereby the device can be a first electronic device. The first electronic device is adapted to be coupled to a second electronic device. The method comprises at the first electronic device certain steps which can be performed by a processor of the first electronic device. In particular, there is a step of generating first data for display at the first electronic device pertaining to an application executable on the first electronic device. Also, there is the step of receiving a signal at the first electronic device from a second electronic device in response to an event detected at the second electronic device. Finally, in response to the received signal, there is modifying the first data, and generating second data for display at the second electronic device pertaining to the application and sending the second data to the second electronic device.

44 Claims, 9 Drawing Sheets

(51) Int. Cl.
*H04M 1/725* (2006.01)
*G06F 3/14* (2006.01)

(52) U.S. Cl.
CPC ........ *G06F 9/4856* (2013.01); *H04M 1/7253* (2013.01); *G09G 2354/00* (2013.01)

(58) Field of Classification Search
USPC ........................................................ 345/156
See application file for complete search history.

(56) References Cited

U.S. PATENT DOCUMENTS

| | | | |
|---|---|---|---|
| 8,930,514 B2* | 1/2015 | Lazaridis et al. | 709/223 |
| 2007/0039025 A1* | 2/2007 | Kraft | H04N 7/147 725/62 |
| 2008/0160974 A1 | 7/2008 | Vartiainen et al. | |
| 2009/0204966 A1 | 8/2009 | Johnson et al. | |
| 2011/0239114 A1* | 9/2011 | Falkenburg | G06F 3/04883 715/702 |
| 2012/0192084 A1* | 7/2012 | Dura | G06F 3/0481 715/751 |
| 2012/0196688 A1* | 8/2012 | Karsten | G07F 17/32 463/43 |
| 2013/0027404 A1* | 1/2013 | Sarnoff | G06T 1/20 345/441 |
| 2013/0151989 A1* | 6/2013 | Dent | G06F 17/30286 715/753 |
| 2013/0222224 A1* | 8/2013 | Eriksson et al. | 345/156 |
| 2013/0318449 A2* | 11/2013 | Dent | G06F 17/30286 715/753 |
| 2015/0199317 A1* | 7/2015 | Lemonik | G06F 17/24 715/255 |

* cited by examiner

DEVICES AND METHODS FOR DISPLAYING DATA IN RESPONSE TO DETECTED EVENTS

CROSS-REFERENCE TO RELATED APPLICATIONS

This application claims priority under 35 U.S.C. §119 to European Patent Application Nos. 13156475.9 filed on Feb. 22, 2013 and 13156473.4 filed on Feb. 22, 2013, the entire content of which are hereby incorporated herein by reference in their entirety.

TECHNICAL FIELD

The present disclosure relates to devices and methods for displaying data in response to detected events.

BACKGROUND

Electronic device users are able to mirror a display from a mobile electronic device, for example, to a general purpose computer, for example. A mirrored display is typically controlled at the device generating the display data. Furthermore, a user is provided with limited or no control of the mirrored display.

BRIEF DESCRIPTION OF THE DRAWINGS

The present disclosure can be understood with reference to the description of the embodiments set out below, in conjunction with the appended drawings in which.

DESCRIPTION

Figure 1:
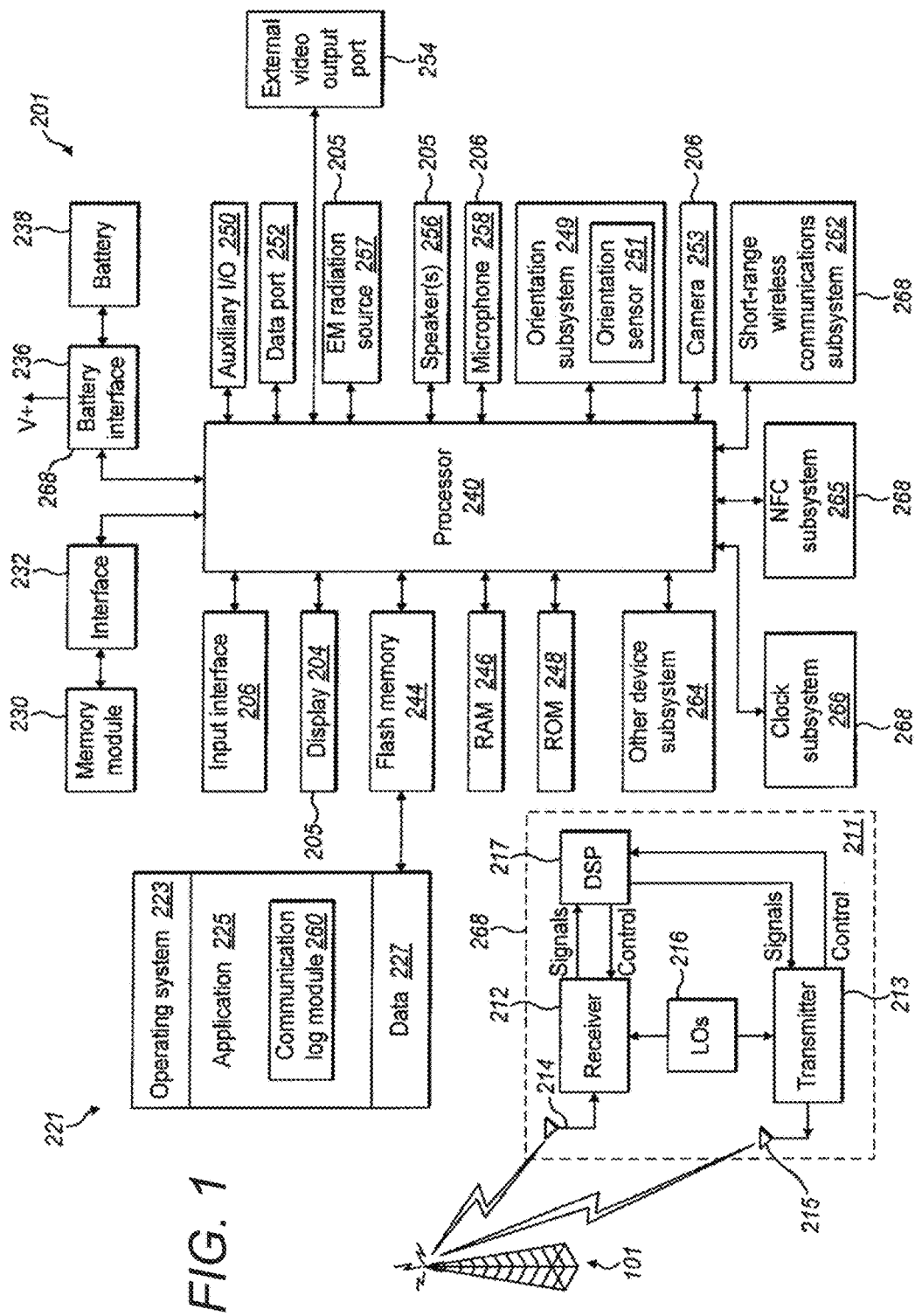
FIG. 1 is a schematic diagram illustrating components of an electronic device usable by a user in some embodiments.

This disclosure below is a description of one or more exemplary embodiments which are not intended to be limiting on the scope of the appended claims.

In a first aspect there is provided a method for use at a first electronic device, the first electronic device being adapted to be coupled to a second electronic device, the method comprising, at the first electronic device: generating first data for display at the first electronic device pertaining to an application executable on the first electronic device; receiving a signal at the first electronic device from a second electronic device in response to an event detected at the second electronic device; and in response to the received signal, modifying the first data, and generating second data for display at the second electronic device pertaining to the application and sending the second data to the second electronic device.

The first electronic device and the second electronic device may be communicatively coupled wirelessly or wired. The communicative coupling may include USB, Wi-Fi (e.g., IEEE 802.11 radio standards) or Bluetooth. The application, when executed on the first electronic device, generates data, which is used to by the first electronic device to generate data for display. The first and second data may be the same, to the extent that a display object, associated with the application executed on the first electronic device, displayed at the first and second electronic devices are the same. If the display objects at the first and second electronic devices are the same, the display object at the first and/or second device may be scaled to better fit the display area, but the information and overall appearance is the same. If the first and second data are the same, it will be appreciated that only one set of data is generated and the same output at the first electronic device and sent to the second electronic device for display.

The method may comprise modifying the first data and modifying the second data in response to an event detected at the first electronic device.

The detected event may be associated with the application.

The method may comprise, in response to receiving a further signal from the second electronic device indicative of a user input detected at the second electronic device, the first electronic device deactivating data input to the application on the first electronic device and activating data input to the application on the second electronic device.

The method may comprise, in response to a user input detected at the first electronic device, the first electronic device deactivating data input to the application on the second electronic device and activating data input to the application on the first electronic device. The terms activate and reactive are used to describe a user-interaction with the application at the first or second electronic devices, and not the activation or deactivation of the application itself.

At least one of the first data and the second data may comprise data for display of a user-editable field. For example, a field where a user may enter or edit text or characters.

The method may comprise, in response to receiving at the first electronic device user-entered data received from the second electronic device, modifying data associated with the application for generating the first and second data. The data associated with the application is used, in this example, to generate the first and second data for display.

The method may comprise, in response to receiving user input at the first electronic device, modifying the second data to cease displaying the second data associated with the application on the second electronic device.

The method may comprise, modifying the first data, in response to detecting that the first and second electronic devices are decoupled. For example, a user may select to terminate the communicative coupling, or the two electronic devices may be moved apart to the extent the two electronic devices are no longer in range for the communicative coupling to operate.

The method may comprise, in response to receiving user input at the first electronic device, modifying the first data to enhance the display at the first electronic device pertaining to the application and modifying the second data to diminish the display at the second electronic device pertaining to the application.

The method may comprise, in response to receiving a further signal from the second electronic indicative of a user input detected at the second electronic device, modifying the second data to enhance the display at the second electronic device pertaining to the application and further modify the first data to diminish the display at the second electronic device pertaining to the application. For example, enhancement of the display may include one or more of providing a display with greater information (e.g., expanding a most recent message view to a multiple message view), rescaling the display and maximising the display to fit the available display area. For example, diminishing the display may include one or more of providing a display with less information (e.g., reducing expanding a multiple message view to a most recent message view), rescaling the display, minimising the display or moving/generating a display icon or notification, which may be located on a tool bar.

The first data for display at the first electronic device may comprise data for one or more of generating, modifying, rendering and removing display objects associated with the application on one or both of the first and second electronic devices.

The second data for display at the second electronic device may comprise data for one or more of generating, modifying, rendering and removing display objects associated with the application on one or both of the first and second electronic devices.

At least one of the display objects for display at the first electronic device may be the same, or relates to at least one identical functional aspect of the application, as at least one of the display objects for display at the second electronic device.

The event may comprise one or more of communicatively coupling the first and second electronic devices, communicatively decoupling the first and second electronic devices, a user input at the first electronic device and a user input at the second electronic device. The event may also comprise a user input associated with a display icon, or notification displayed at the second electronic device, where the notification is displayed in response to a message application active on the first electronic device receiving a message. In the example of a notification, it will be appreciated that there is already an established communication link between the two electronic devices, and an application actively running on either or both of the first and second electronic devices, generates data to generates the notification.

The first electronic device may be wireless communication device and the second electronic device may be a computer device.

In a second aspect there is provided a computer-readable medium comprising executable instructions which, when executed, cause a processor to perform a method for use at a first electronic device, the first electronic device being adapted to be coupled to a second electronic device, the method comprising, at the first electronic device: generating first data for display at the first electronic device pertaining to an application executable on the first electronic device; receiving a signal at the first electronic device from a second electronic device in response to an event detected at the second electronic device; and in response to the received signal, modifying the first data, and generating second data for display at the second electronic device pertaining to the application and sending the second data to the second electronic device.

In a third aspect there is provided a first electronic device adapted to perform a method for use at the first electronic device, the first electronic device being adapted to be coupled to a second electronic device, the method comprising, at the first electronic device: generating first data for display at the first electronic device pertaining to an application executable on the first electronic device; receiving a signal at the first electronic device from a second electronic device in response to an event detected at the second electronic device; and in response to the received signal, modifying the first data, and generating second data for display at the second electronic device pertaining to the application and sending the second data to the second electronic device.

In a fourth aspect there is provided a first electronic device adapted to be coupled to a second electronic device in use, the first electronic device comprising: a display; processing circuitry configured to execute an application and receive a signal from the second electronic device indicative of an event detected at the second electronic device, when the first electronic device is coupled to the second electronic device; wherein the processing circuitry is further configured to generate for display on the display first data pertaining to the application, modify the first data in response to the received signal, generate second data for display at the second electronic device pertaining to the application, and send the second data to the second electronic device, when the second device first electronic device is coupled to the second electronic device.

The processing circuitry may be further configured to modify the first data and modifying the second data in response to an event detected at the first electronic device.

The processing circuitry may be further configured to, in response to receiving a further signal from the second electronic device indicative of a user input detected at the second electronic device, deactivate data input to the application on the first electronic device and activate data input to the application on the second electronic device.

The processing circuitry may be further configured to, in response to a user input detected at the first electronic device, deactivate data input to the application on the second electronic device and activating data input to the application on the first electronic device.

The processing circuitry may be further configured to, in response to receiving at the first electronic device user-entered data received from the second electronic device, modify data associated with the application for generating the first and second data.

The processing circuitry may be further configured to, in response to receiving user input at the first electronic device, modify the second data to cease displaying the second data associated with the application on the second electronic device.

The processing circuitry may be further configured to, modify the first data, in response to detecting that the first and second electronic devices are decoupled.

The processing circuitry may be further configured to, in response to receiving user input at the first electronic device, modify the first data to enhance the display at the first electronic device pertaining to the application and modify the second data to diminish the display at the second electronic device pertaining to the application.

The processing circuitry may be further configured to, in response to receiving a further signal from the second electronic indicative of a user input detected at the second electronic device, modify the second data to enhance the display at the second electronic device pertaining to the application and further modify the first data to diminish the display at the second electronic device pertaining to the application.

In a fifth aspect there is provided a method for use at a second electronic device, the second electronic device being adapted to be coupled to a first electronic device adapted to generate first data for display at the first electronic device pertaining to an application executable on the first electronic device, the method comprising, at the second electronic device: generating a signal at the second electronic device in response to an event detected at the second electronic device; transmitting the signal to the first electronic device; receiving from the first electronic device, in response to the transmitted signal, second data for display at the second electronic device pertaining to the application executable on the first electronic device; and displaying the second data on a display at the second electronic device.

The second data may be displayed at the second electronic device within an application executed on the second electronic device.

The method may comprise receiving modified second data in response to an event detected at the first electronic device.

The detected event may be associated with the application.

The method may comprise, in response to detecting user input at the second electronic device, activating data input to the application on the second electronic device, and deactivating data input to the application on the first electronic device.

The method may comprise, in response to detecting user input at the first electronic device, deactivating data input to the application on the second electronic device and activating data input to the application on the first electronic device.

The second data may comprise data for display of a user-editable field on the display at the second electronic device.

The method may comprise removing the display associated with the application from the second electronic device in response to receiving user input at the first electronic device and generating modified second data which is received at the second electronic device.

The method may comprise modifying, in response to detecting that the first and second electronic devices are decoupled, the first data.

The method may comprise, modifying, in response to detecting user input at the first electronic device, the second data to diminish the display at the second electronic device pertaining to the application, and further modifying the first data to enhance the display at the first electronic device pertaining to the application.

The method may comprise modifying, in response to detecting user input at the second electronic device, the second data to enhance the display at the second electronic device pertaining to the application, and further modifying the first data to diminish the display at the second electronic device pertaining to the application.

The second data for display at the second electronic device may comprise data for one or more of generating, modifying, rendering and removing display objects associated with the application on one or both of the first and second electronic devices.

The at least one of the display objects for display at the first electronic device may be the same, or relates to at least one identical functional aspect of the application, as at least one of the display objects for display at the second electronic device.

The event may comprise one or more of communicatively coupling the first and second electronic devices, communicatively decoupling the first and second electronic devices, and a user input detected at the first and/or second electronic devices. The user input may be in the form of a gesture (e.g. a swipe across the first electronic device) or a more a direct selection, for example, selecting a selectable display icon.

The first electronic device may be a wireless communication device and the second electronic device may be a computer device.

In a sixth aspect there is provided a computer-readable medium comprising executable instructions which, when executed, cause a processor to perform a method at a second electronic device, the second electronic device being adapted to be coupled to a first electronic device adapted to generate first data for display at the first electronic device pertaining to an application executable on the first electronic device, the method comprising: generating a signal at the second electronic device in response to an event detected at the second electronic device; transmitting the signal to the first electronic device; receiving from the first electronic device, in response to the transmitted signal, second data for display at the second electronic device pertaining to the application executable on the first electronic device; and displaying the second data on a display at the second electronic device.

In a seventh aspect, there is provided a computer-readable medium comprising executable instructions which, when executed, cause a processor to perform one or more of the above methods. The executable instructions may be computer-executable instructions. A device may be configured to receive the executable instructions from the computer-readable medium, and/or comprise the executable instructions, and be configured to execute the executable instructions.

In an eighth aspect, there is provided a device configured to perform one or more of the above methods. The device may further comprise a processor configured to perform one or more of the above methods. The processor may comprise one or more discrete electronic components.

Reference is made to FIG. 1 which illustrates an electronic device 201 which is usable in accordance with the disclosure below. An electronic device 201 such as the electronic device 201 of FIG. 1 is configured to generate a user-controllable interface on a built-in display and/or on a remote, external display device, or on a built-in display and on a remote, external display device. In the context of this disclosure, the term "remote" means a display screen which is not built-in to the electronic device 201 with which the electronic device 201 communicates via a physical wired connection or via a wireless connection.

It will be appreciated that, in certain embodiments, some of the features, systems or subsystems of the electronic device 201 discussed below with reference to FIG. 1 may be omitted from electronic devices 201 which are intended to perform solely operations in relation to the generation and output of display data and the modification of media content output.

In one embodiment, the electronic device 201 is a communication device and, more particularly, may be a mobile or handheld device, such as a mobile or handheld communication device, for example having data and voice communication capabilities. It may also have the capability to communicate with other computer systems; for example, via a data link or network, such as a short-range radio frequency link, e.g. Bluetooth, or via a data network, which may be wireless (e.g., WiFi using IEEE 802.11 radio standards) and may be connected to the Internet. It will be appreciated that the electronic device 201 may take other forms, including any one of the forms listed below. Depending on the functionality provided by the electronic device 201, in certain embodiments, the electronic device 201 is a multiple-mode communication device configured for both data and voice communication, a mobile telephone, such as a smartphone, a wearable computer such as a watch, a tablet computer, a personal digital assistant (PDA), or a computer system such as a notebook, laptop or desktop system. The electronic device 201 may take other forms apart from those specifically listed above. The electronic device 201 may also be referred to as a mobile, handheld or portable communications device, a communication device, a mobile device and, in some cases, as a device. In the context of this disclosure, the term "mobile" means the device is of a size or weight which makes it readily portable by a single individual, e.g. of a weight less than 5, 4, 3, 2, 1, 0.5, 0.4, 0.3, 0.2 or 0.1 kilograms, or of a volume less than 15,000, 10,000, 5,000, 4,000, 3,000, 2,000, 1,000, 500, 400, 300, 200, 100, 90, 80, 70, 60, 50, 40, 30, 20, 10 or 5 cubic centimeters. As such, the device 201 may be portable in a bag, or clothing pocket.

The electronic device 201 includes a controller including a processor 240 (such as a microprocessor) which controls the operation of the electronic device 201. In certain electronic devices, more than one processor is provided, with each processor in communication with each other and configured to perform operations in parallel, so that they together control the overall operation of the electronic device. The processor 240 interacts with device subsystems, such as a wireless communication subsystem 211 for exchanging radio frequency signals with a wireless network 101 to perform communication functions. The processor 240 is communicably coupled with additional device subsystems including one or more output interfaces 205 (such as one or more of: a display 204, a speaker 256, electromagnetic (EM) radiation source 257), one or more input interfaces 206 (such as one or more of: a camera 253, microphone 258, keyboard (not shown), control buttons (not shown), a navigational input device (not shown), a touch-sensitive overlay (not shown)) associated with a touchscreen 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), an external video output port 254, a near field communications (NFC) subsystem 265, a short-range communication subsystem 262, a clock subsystem 266, a battery interface 236, and other device subsystems generally designated as 264. Some of the subsystems shown in FIG. 1 perform communication-related functions, whereas other subsystems may provide "resident" or on-device functions.

The electronic device 201 stores data 227 in an erasable persistent memory, which in one embodiment is the flash memory 244. In various embodiments, the data 227 includes service data including information used by the electronic device 201 to establish and maintain communication with the wireless network 101. The data 227 may also include user application data such as email messages, address book and contact information, calendar and schedule information, notepad documents, presentation documents and information, word processor documents and information, spread sheet documents and information; desktop publishing documents and information, database files and information; image files, video files, audio files, internet web pages, and other commonly stored user information stored on the electronic device 201 by its user, and other data. The data may also include program application data such as functions, controls and interfaces from an application such as an email application, an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 includes a clock subsystem or module 266 comprising a system clock configured to measure system time. In one embodiment, the system clock comprises its own alternate power source. The system clock provides an indicator of a current time value, the system time, represented as a year/month/day/hour/minute/second/milliseconds value. In other embodiments, the clock subsystem 266 additionally or alternatively provides an indicator of the current time value represented as a count of the number of ticks of known duration since a particular epoch.

The clock subsystem 266, the communication subsystem 211, the NFC subsystem, 265, the short-range wireless communications subsystem 262, and the battery interface 236 together form a status report subsystem 268 which is configured to provide an indicator of the operating status of the device.

The display 204 receives display data generated by the processor 240, such that the display 204 displays certain application data stored as a segment of the data 227 from the memory (any of the flash memory 244, random access memory (RAM) 246, read only memory (ROM) 248) in a predetermined way on display screen (not shown) of the display 204, according to the processing performed by the processor 240.

In certain embodiments, the external video output port 254 is integrated with the data port 252. The external video output port 254 is configured to connect the electronic device 201 via a wired connection (e.g. video graphics array (VGA), digital visual interface (DVI) or high definition multimedia interface (HDMI)) to an external (or remote) display device 290 which is separate and remote from the electronic device 201 and its display 204. The processor 240 outputs external display data generated by the processor 240 via the external video output port 254, such that the external display device 290 can display application data from the memory module in a predetermined way on an external display screen (not shown) of the external display device 290. The processor 240 may also communicate the external display data to the external display device 290 in a similar fashion over a wireless communications path.

At any given time, the display data and the external display data generated by the processor 240 may be identical or similar for a predetermined period of time, but may also differ for a predetermined period of time, with the processor 240 controlling whether the display data and the external display data are identical or differ based on input from one or more of the input interfaces 206. In this context, the word "identical" means that both sets of data comprise similar content so as to generate an identical or substantially similar display at substantially the same time on both the external display device 290 and the display 204. In this context, the word "differ" means that the external display data and display data are not identical; this is to say that these data may (but not necessarily) include identical elements of data, for example representative of the same application data, but the external display data and display data are not wholly identical. Hence, the display on both the external display device 290 and the display 204 are not wholly identical, although similar or identical individual items of content based on the application data may be displayed on both the external display device 290 and the display 204.

In at least some embodiments, the electronic device 201 includes a touchscreen which acts as both an input interface 206 (e.g. touch-sensitive overlay) and an output interface 205 (i.e. display). The touchscreen may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The processor 240 is in communication with the memory and the touch-sensitive input interface 206 to detect user input via the input interface 206. The processor 240 then generates or updates display data comprising a display object for display by the display device 204 in accordance with the user input. The processor 240 then outputs the display data for display on the display device 204. In an embodiment, the user input may comprise a swipe gesture across the touchscreen interface 206.

In at least some embodiments, the touch-sensitive overlay has a touch-sensitive input surface which is larger than the display 204. For example, in at least some embodiments, the touch-sensitive overlay may extend overtop of a frame (not shown) which surrounds the display 204. In such embodiments, the frame (not shown) may be referred to as an active frame since it is capable of acting as an input interface 206. In at least some embodiments, the touch-sensitive overlay may extend to the sides of the electronic device 201.

The input interface 206 may also comprise the touchscreen, in which case the electronic device 201 may be referred to as a 'multi-touch device'. The input detected by the touchscreen interface may comprise any suitable user touch-based input. For example, the input may comprise a gesture input such as a tap, a multi-tap, a long press, a swipe or scroll or slide, a pan, a flick, a multi-swipe, a multi-finger tap, a multi-finger scroll or swipe, a pinch, a two-hand pinch, a spread, a two-hand spread, a rotation, a two-hand rotation, a slide and rotation, a multi-direction slide, a multi-finger slide and rotation, a multi-finger slide, etc. It will be appreciated that the gesture input may comprise a sequence of input elements or stages performed within a specified or predetermined time frame, for example, a three-tap gesture in which each tap comprises an element (or a sub-input, a phase or a stage) of the input and the three taps are performed within a time frame that enables the processor 240 to detect the taps as elements of a single input. Additionally or alternatively, an input may comprise removing a point of contact, e.g., a finger or stylus, from the touchscreen interface.

Many examples described herein refer to a gesture detected by a touch-sensitive display, but other methods of gesture detection may be used. For example, a gesture may be a generalized trajectory description characterized as a sequence of 3D points in time, and as such many different sensors may be utilized to detect such a gesture. The gesture may be performed by moving a portable electronic device or moving one or more body parts, such as fingers or thumbs as a 3D spatial gesture. For example, sensors, such as an accelerometer/gyroscope, or proximity sensors, or time-of-flight cameras may detect such gestures. Gesture recognition and detection techniques of this type are known.

An accelerometer or gyroscope may be utilized to detect 3D spatial gestures. A sequence of acceleration values may be detected in the different spatial dimensions as a function of time and constitute trajectory information that can be recognized as a gesture. For example, a quick flick and a tilt of the portable electronic device are examples of detectable gestures. A 3D spatial gesture includes a continuous movement, a sequence of movements, and a series of continuous movements or sequences of movements. Proximity sensors, optical sensors, and/or cameras may be utilized to detect 3D spatial gestures comprising motion of objects spaced from the device.

A gesture input is different to input of a command by manipulation of a control component presented on the screen because a gesture input can be performed at any location within the display screen (or a large area of the display screen) in contrast to a single contact point for a user finger or input stylus on a corresponding control element. In order to input a command using a control component, the user must contact the screen at a specific location corresponding to that component. For example, in order to change an output volume using a volume control, the user must select the volume control by touching the location at which the volume control is displayed and moving the displayed control element by a desired amount through movement of the user's finger across the screen. Such user input must therefore be precisely controlled in order to use control elements to input commands. Gesture-based inputs, on the other hand, do not require the same precise control as they are not tied to a specific location on the screen. Instead, a user wishing to, e.g., scroll through a list of media content can do so by performing a swipe gesture at any location within a media-player display.

As noted above, in some embodiments, the electronic device 201 includes a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217 which is in communication with the processor 240. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate.

In at least some embodiments, the electronic device 201 communicates with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some embodiments, the auxiliary input/output (I/O) subsystems 250 include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some embodiments, specifies the orientation of the device 201 relative to the gravitational field of the earth. Additionally or alternatively, the orientation sensor 251 may generate orientation data which specifies the orientation of the device relative to known locations or fixtures in a communication network.

In some embodiments, the orientation subsystem 249 includes other orientation sensors 251, instead of or in addition to accelerometers. For example, in various embodiments, the orientation subsystem 249 may include a gravity sensor, a gyroscope, a tilt sensor, an electronic compass or other suitable sensor, or combinations thereof. In some embodiments, the device orientation subsystem 249 may include two or more orientation sensors 251 such as an accelerometer and an electronic compass.

The electronic device 201, in at least some embodiments, includes a Near-Field Communication (NFC) subsystem 265. The NFC subsystem 265 is configured to communicate with other electronic devices 201 or tags, using an NFC communications protocol. NFC is a set of short-range wireless technologies which typically require a distance of 4 cm or less for communications. The NFC subsystem 265 may include an NFC chip and an NFC antenna. In such an embodiment, the orientation sensor 251 may generate data which specifies a distance between the electronic device 201 and an NFC transceiver.

The electronic device 201 includes a microphone or one or more speakers. In at least some embodiments, an electronic device 201 includes a plurality of speakers 256. For example, in some embodiments, the electronic device 201 includes two or more speakers 256. The two or more speakers 256 may, for example, be disposed in spaced relation to one another. That is, in at least some embodiments, the electronic device 201 may include a first speaker and a second speaker and the first speaker and the second speaker may be spatially separated from one another within the electronic device 201. In at least some embodiments, the display 204 may be disposed between the first speaker and the second speaker of the electronic device. In such embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display.

In at least some embodiments, each speaker 256 is associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 or the housing of the electronic device 201. In such embodiments, the direction of capture of the camera is always predictable relative to the display 204 or the housing. In at least some embodiments, the camera may be provided in a central location relative to the display 204 to facilitate image acquisition of a face.

In at least some embodiments, the electronic device 201 includes an electromagnetic (EM) radiation source 257. In at least some embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images detected by the camera.

In some embodiments, the electromagnetic radiation source 257 is an infrared (IR) radiation source which is configured to emit infrared radiation. In at least some embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some embodiments, the camera 253 is configured to capture at least some electromagnetic radiation which is not in the visible spectrum.

In some embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. In at least some embodiments, the short-range communication subsystem 262 is a wireless bus protocol compliant communication mechanism such as a Bluetooth® communication module to provide for communication with similarly-enabled systems and devices.

Any one or more of the communication subsystem 211, the NFC subsystem 265 and the short-range wireless communications subsystem 262 serves as a "communication subsystem" which is configured to provide an indicator of an incoming message being received by the electronic device 201. The incoming message may be an email, a message received via a social networking website, an SMS (short message service) message, or a telephone call, for example.

The electronic device 201 is, in some embodiments, a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 can compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such as a media player module 260. In the embodiment of FIG. 1, the media player module 260 is implemented as a stand-alone application 225. However, in other embodiments, the presentation module 260 could be implemented as part of the operating system 223 or other applications 225.

As discussed above, electronic devices 201 which are configured to perform operations in relation to a communications log may take a variety of forms. In at least some embodiments, one or more of the electronic devices which are configured to perform operations in relation to the presentation module 260 are a smart phone or a tablet computer.

Figure 2:
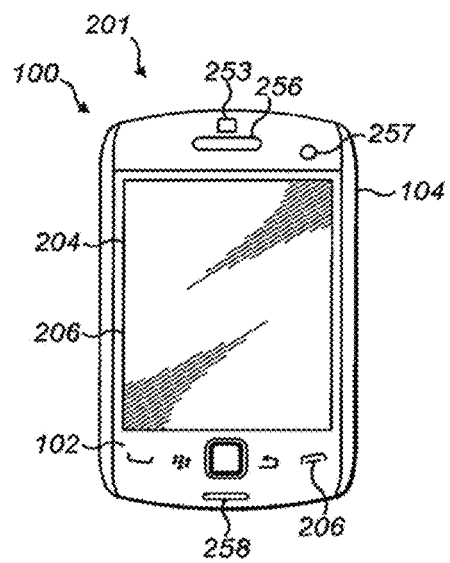
FIG. 2 is a plan view of the upper external side of one electronic device usable by an end-user in some embodiments.

Referring now to FIG. 2, a front view of an electronic device 201 which in one example may be a mobile device 100 is illustrated. The mobile device 100 (e.g. smart phone) is a phone which offers more advanced computing capability than a basic non-smartphone cellular phone. For example, the mobile device 100 may have the ability to run third party applications which are stored on the mobile device.

The mobile device 100 includes all of the components discussed above with reference to FIG. 1, or a subset of those components. The mobile device 100 includes a housing 104 which houses at least some of the components discussed above with reference to FIG. 1.

In the embodiment, the mobile device includes a display 204, which may be a touchscreen which acts as an input interface 206. The display 204 is disposed within the mobile device 100 so that it is viewable at a front side 102 of the mobile device 100. That is, a viewable side of the display 204 is disposed on the front side 102 of the electronic device. In the embodiment illustrated, the display 204 is framed by the housing 104.

The mobile device 100 also includes other input interfaces 206 such as one or more buttons, keys or navigational input mechanisms. In the embodiment illustrated, at least some of these additional input interfaces 206 are disposed for actuation at a front side 102 of the mobile device.

The mobile device may also include a speaker 256. In the embodiment illustrated, the mobile device includes a single speaker 256 which is disposed vertically above the display 204 when the mobile device 100 is held in a portrait orientation where its height is longer than its width. The speaker 256 may be disposed on the front face of the mobile device 100.

While the mobile device 100 of FIG. 2 includes a single speaker 256, in other embodiments, the mobile device 100 may include a greater number of speakers 256. For example, in at least some embodiments, the mobile device 100 may include a second speaker 256 which is disposed vertically below the display 204 when the mobile device is held in a portrait orientation where its height is longer than its width (i.e. the orientation illustrated in FIG. 2).

The mobile device 100 also includes a microphone 258. In the embodiment illustrated, the microphone 258 is vertically disposed below the display 204 when the mobile device is held in the portrait orientation. The microphone 258 and at least one speaker 256 may be arranged so that the microphone is in close proximity to a user's mouth and the speaker 256 is in close proximity to a user's ear when the user holds the phone to their face to converse on the mobile device.

The mobile device 100 also includes a front facing camera 253 which may be located vertically above the display 204 when the mobile device 100 is held in a portrait orientation where its height is longer than its width. The front facing camera 253 is located so that it may capture images of objects which are located in front of or surrounding the front side of the mobile device 100.

The mobile device 100 also includes an electromagnetic radiation source 257. The electromagnetic radiation source 257 is disposed on the front side 102 of the mobile device 100. In this orientation, electromagnetic radiation which is produced by the electromagnetic radiation source 257 may be projected onto objects which are located in front of or surrounding the front side of the mobile device 100. Such electromagnetic radiation (or the projection of electromagnetic radiation onto objects) may be captured on images detected by the camera 253.

Figure 3:
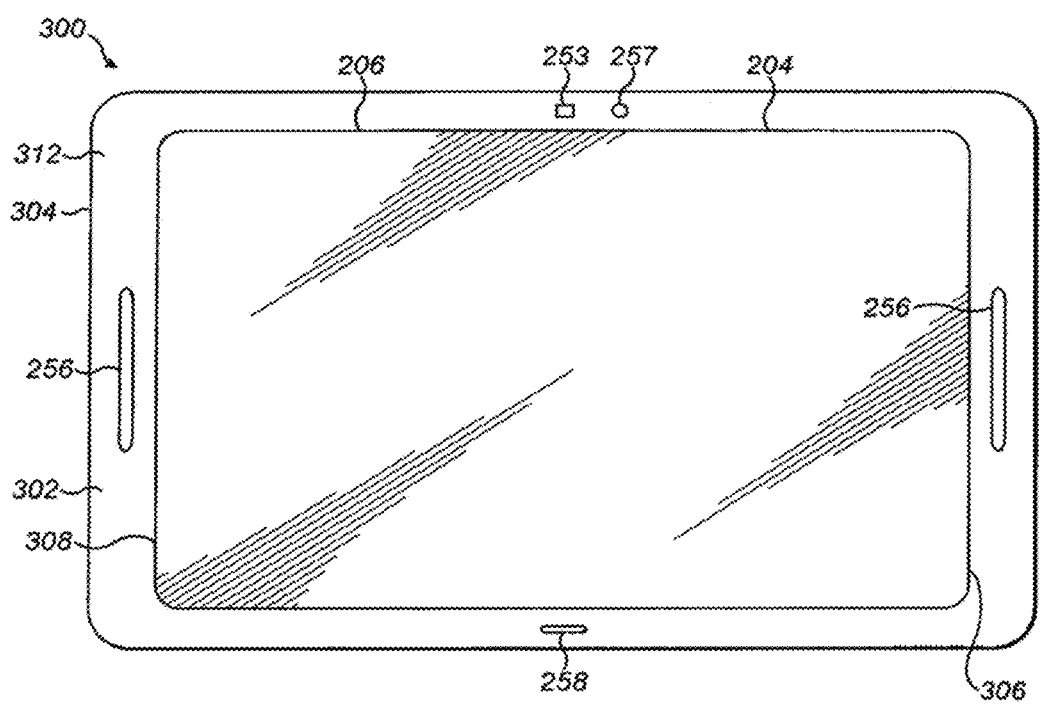
FIG. 3 is a plan view of the upper external side of one alternative electronic device usable by an end-user in some embodiments.

Referring now to FIG. 3, a front view of an example electronic device 201, which in one embodiment may be a tablet computer 300, is illustrated. The tablet computer 300 may be any other form of electronic device and includes mobile devices, laptop computers, personal computers or a desk top computer. The tablet computer or electronic device 300 may include the components discussed above with reference to FIG. 1 or a subset of those components. The electronic device 300 includes a housing 304 which houses at least some of the components discussed above with reference to FIG. 1.

The electronic device 300 includes a display 204, which may be a touchscreen which acts as an input interface 206. The display 204 is disposed within the electronic device 300 so that it is viewable at a front side 302 of the electronic device 300. That is, a viewable side of the display 204 is disposed on the front side 302 of the electronic device 300. In the embodiment illustrated, the display 204 is framed by the housing 304.

A frame 312 surrounds the display 204. The frame 312 is portion of the housing 304 which provides a border around the display 204. In at least some embodiments, the frame 312 is an active frame 312. That is, the frame has a touch sensitive overlay which allows the electronic device 201 to detect a touch applied to the frame thus allowing the frame 312 to act as an input interface 206 (FIG. 1).

The electronic device 300 includes a plurality of speakers 256. In the embodiment illustrated, the tablet includes two speakers 256. The two speakers 256 are disposed on opposing sides of the display 204. More particularly, when the electronic device 300 is held in a landscape orientation (such as the orientation illustrated in FIG. 3) where its width is longer than its height, one of the two speakers is disposed on a right side 306 of the display 204 and one of the speakers is disposed on the left side 308 of the display 204.

Both speakers 256 are disposed on the front side 302 of the electronic device 300.

The electronic device 300 also includes a microphone 258. In the embodiment illustrated, the microphone 258 is vertically disposed below the display 204 when the electronic device is held in the landscape orientation illustrated in FIG. 3. The microphone 258 may be located in other locations in other embodiments.

The electronic device 300 also includes a front facing camera 253 which may be located vertically above the display 204 when the electronic device 300 is held in a landscape orientation (i.e. the orientation of FIG. 3). The front facing camera 253 is located so that it may capture images of objects which are located in front of or surrounding the front side of the electronic device 300.

The example electronic device 300 also includes an electromagnetic radiation source 257. The electromagnetic radiation source 257 is disposed on the front side 304 of the electronic device 300. In this orientation, electromagnetic radiation which is produced by the electromagnetic radiation source 257 may be projected onto objects which are located in front of or surrounding the front side 302 of the electronic device 300. Such electromagnetic radiation (or the projection of electromagnetic radiation onto objects) may be captured on images detected by the camera 253.

The electronic device 300 may have the ability to run third party applications which are stored on the electronic device.

The electronic device 201, which may be tablet computer or other mobile device 300, is usable by an end-user to send and receive communications using electronic communication services supported by a service provider.

The end-user of an electronic device 201 may send and receive communications with different entities using different electronic communication services. Those services may or may not be accessible using one or more particular electronic devices. For example, a communication source of an end-user's text messages sent and received by an end-user using a particular electronic device 201 having a particular memory module 230, such as a USIM, may be accessible using that device 201, but those text messages may not be accessible using another device having a different memory module. Other electronic communication sources, such as a web-based email account, may be accessible via a web-site using a browser on any internet-enabled electronic device.

Figure 4:
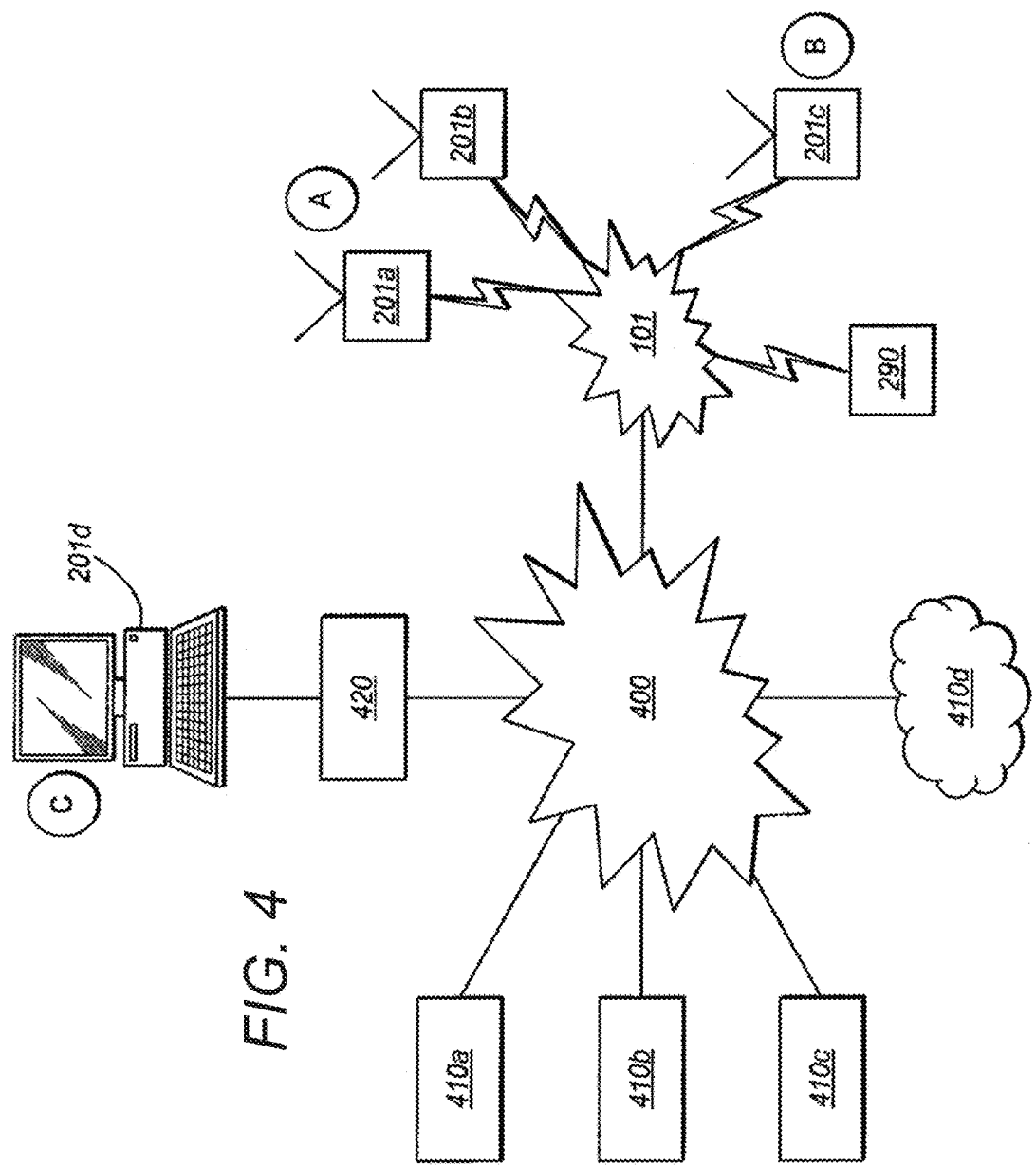
FIG. 4 is a schematic diagram of a system in which the aforementioned electronic devices can be employed in some embodiments.

FIG. 4 shows a system of networked apparatus by which electronic communications can be sent and received using multiple electronic devices 201a, 201b, 201c. Referring to FIG. 4, electronic devices 201a, 201b and 201c are connected to wireless network 101 to perform voice and data communications, and to transmit data to an external display device 290 residing on the wireless network. Wireless network 101 is also connected to the communications network 400, e.g. Internet. Electronic device 201a may be a tablet computer similar to tablet computer 300 described in FIG. 2 above. Electronic devices 201b and 201c may be smartphones. Electronic device 201d is a computing device such as a notebook, laptop or desktop, which is connected by a wired broadband connection to Local Area Network 420, and which is also connected to the communications network 400. Electronic devices 201a, b, c, d may access the communications network 400 to perform data communications therewith.

Servers 410a, 410b, 410c and 410d are also connected to the communications network 400 and one or more of them may individually or together support electronic communications services available to end-users of electronic devices 201a, 201b, 201c and 201d, enabling them to send and receive electronic communications. Servers 410a, 410b, 410c and 410d may be web servers or communications servers, such as email servers.

Other servers and services may of course be provided allowing users of electronic devices 201a, 201b, 201c and 201d to send and receive electronic communications by, for example, Voice over IP phone calls, video IP calls, video chat, group video chat, blogs, file transfers, instant messaging, and feeds.

Wireless network 101 may also support electronic communications without using communications network 400. For example, a user of smart phone 201b may use wireless network 101 to make telephony calls, video calls, send text messages, send multimedia messages, and send instant messages to smart phone 201c, and to display application data on a display screen of the external display device 290, or control the display of application data.

The embodiment shown in FIG. 4 is intended to be non-limiting and additional network infrastructure may of course be provided, such as a Public Switched Telephone Network (not shown), which may be used, for example, to make telephony calls using smartphone 201b to a wired phone (not shown).

In order to explain certain example modes of operation, reference is made below to FIGS. 5A to 6B. Reference is made to a first electronic device 100 and a second electronic device 300, each of which include a processor 240 that is functionally similar but a different processor. The processor 240 may comprise one or more processing circuits configured to perform the methods described herein and the one or more processing circuits may comprise one or more discrete electronic components.

Figure 5A:
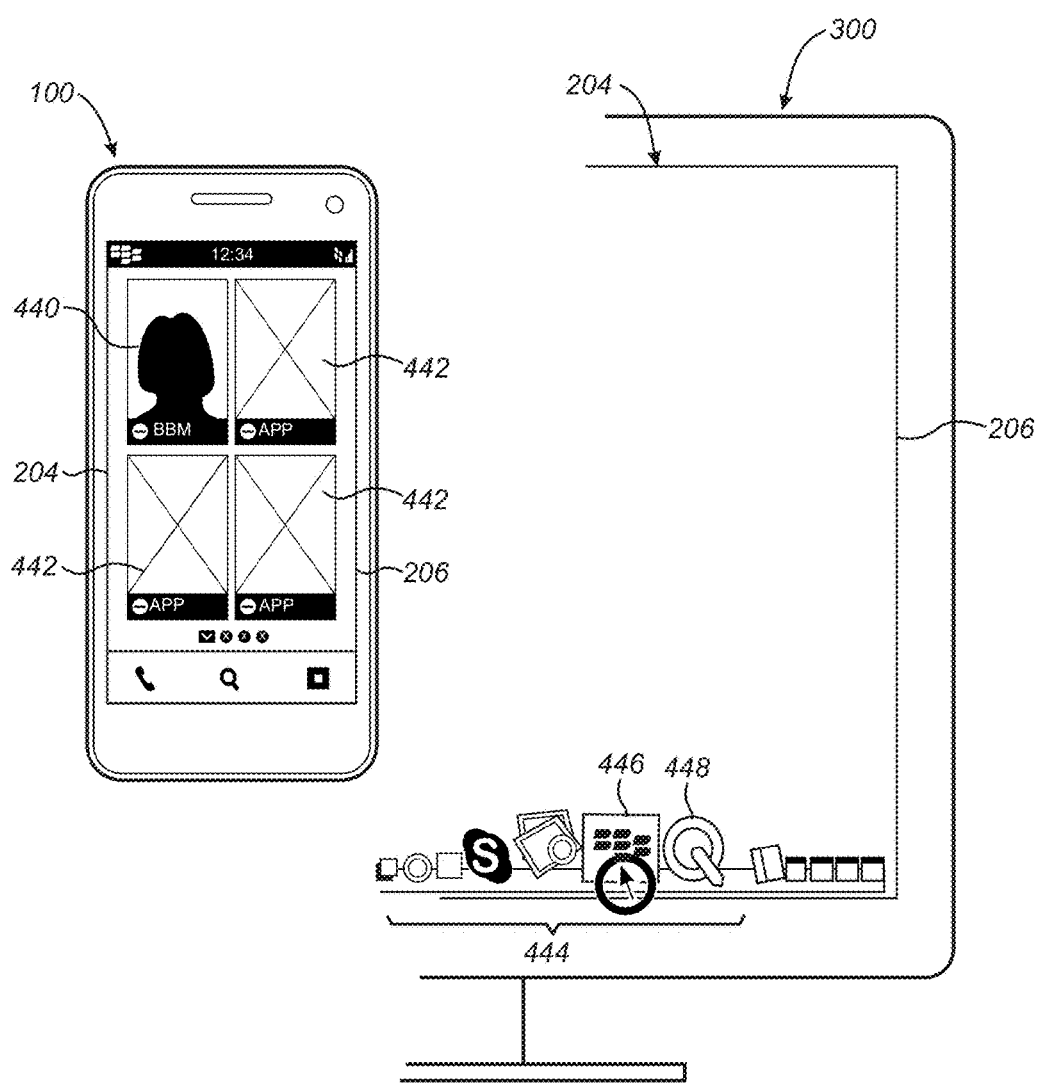
FIGS. 5A to 5D illustrates the two devices illustrated in FIGS. 2 and 3 in communication with one another for generating data for displays.

FIG. 5A illustrates the electronic device 100 and electronic device 300 illustrated in FIGS. 2 and 3 respectively. The electronic device 100 may, for example, be a mobile device or a wireless communication device, such as a smartphone, and will be referred to as the first electronic device 100. The second device 300 may be a general purpose computer device of the form that includes a processor 240 and display 204 within the same housing and will be referred to herein as the second device 300, but may be any one of the other electronic devices discussed above. The second device 300 also comprises one or more input devices 206 including a keyboard (not shown), and a touchscreen 204.

The first electronic device 100 is illustrated with a number of applications 442 which are currently running or are executed by the processor 240. These applications may be stored in memory of the first device 100, for example memory 253. The execution of the applications 442 is shown through selectable display objects or icons, the data for which is generated by the processor 240 of the first device 100. One of the display icons represents a message application 440. In this example, the first device 100 and the second electronic device 300 are coupled to one another. That is to say that the first and second devices 100, 300 are communicatively coupled together via a wired or wireless connection, as described above. The display icons 440, 442 may be referred to as active frames or wire frames, and provide a minimised view of applications currently active on the processor 240 of the first device 100, and provide the user with details of the applications. For example, the message application represented by display icon 440 provides the user with the details of the most recent message. If a user selects one of the display icons 440, 442, an expanded (e.g., maximised or enhanced) view of the application associated with the selected display icon is provided to the user.

The message application 440 is currently active or activated on the first device 100 and is currently receiving messages and allows a user to also send a response, by selecting the application in a typical manner and entering text or characters as a data input. In this example, the display icon 440 illustrates an image representing a person holding a conversation, a name or identification of the person, the last received or sent message in the conversation and optionally a time and date stamp of the last sent or received message. The data for display of the display icon 440 representing the message application is generated by the processor 240 of the first device 100.

The second device 300 includes a number of selectable display icons or objects 444 that allow a user to launch or execute one or more applications or software, stored within memory (e.g., memory 253) of the second electronic device 300. These icons are displayed on a display 204 of the second device 300, the data for which is provided by the processor 240 of the second device 300. One of the display icons 444 is a display icon 446 for launching or executing a messenger application on the processor 240 of the second device 300. The messenger application 446 is launched in the usual manner by a user selecting the selectable display object or icons representing the message application 446, using an input device 206 of the second device 300, which in this example is a touchscreen overlaying the display 204. It will be appreciated that other input devices 206 could be used, such a mouse or trackball (not shown). The selection of the selectable display object or icons representing the message application 446 is illustrated in the figure with the pointer 448. In this example, selecting to launch the messenger application represented by the display icon 446 is referred to as an event and represents a user input at the second electronic device 300. When a user selects the display icon 446 displayed on the display 204 of the second device 300, the processor 240 of the second device 300 generates data comprised in a signal, which is supplied or transmitted to the first device 100. The signal supplied to and received by the first device 100 comprises data to instruct the processor 240 of the first device 100 that an event has occurred, which in this example is a user input to launch the message application on the second device 300.

Figure 5B:
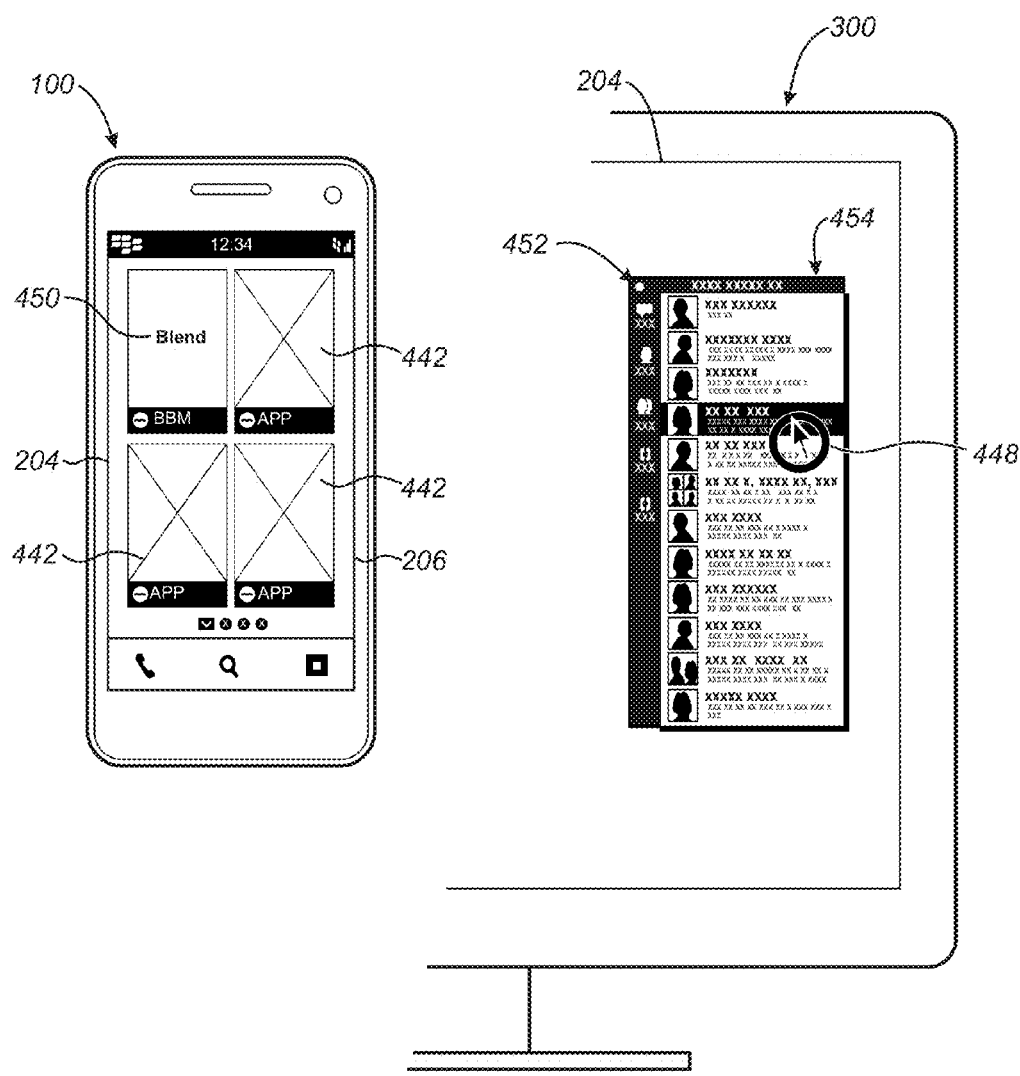

FIG. 5B illustrates the first electronic device 100 and the second electronic device 300 illustrated in FIG. 5A, and the same reference numerals are used for like features. In response to the received signal, indicative of an event that has occurred at the second device 300, the processor 240 of the first electronic device 100 performs one or more actions. In the is example, the processor 240 of the first electronic device 100 modifies, alters or updates the data (e.g., first data) for generating a display representative of the message application running on the first device 100, in response to the signal received from the second device 300, and outputs the modified data to the display 204 of the first device 100. As illustrated in the figure, the data output to the display 204 of the first device 100 is updated so that the user is presented with a message to indicate that the message application is currently blended with the display 204 of the second device 300 and in use on the second device 300. For example, the display icon 450, says "messenger Blended with second device". The data for display generated by the processor 240 of the first device 100 to generate the display icon is also modified to remove the other features of the message application describe above. In this example, the user is unable to interact with the display icon 450 representing the blended message application. That is to say that the message application represented by display icon 450 is inactive or deactivated to receiving user data input. This feature is optional.

In response to receiving the signal from the processor 240 of the second device 300, the processor 240 of the first device 100 generates data (i.e., second data) for generating a display associated with the application running on the first device 100, for display at the second device 300. This second data is transmitted or outputted to the second device 300 for display. In this example, when a user launches the message application on the second device 300, the processor 240 of the second device 300 only generates a window 454 that will have included therein a display generated using the data received from the first device 100. As illustrated in the figure, the window 454, generated by the second device 300, has a display 452 therein that has been generated using the data received from the first device 100. In other words the display object 452 is rendered by the first device 100, and is displayed on the display 204 of the second device 300 within the window 454 provided at the second device 300. In this example, the display object 452 includes an expanded view of the message application illustrated by the display icon 440 in FIG. 5A.

The user is permitted to interact with the display object 452 using one or more input devices of the second device 300, as is illustrated by the cursor 448. If the user selects a message, or message string, from the display icon 452, for example, the processor 240 of the second device 300 transmits or outputs a signal to the first device 100, so that the application is controlled to perform actions based on the user selection. For example, the user may wish to reply to one of the messages displayed in the display icon 452. By selecting a message the user is indicating he wishes to respond to a message, such that in response to the user selection transmitted to the first device 100, the processor 240 of the first device 100 updates or modifies the data associated with the display icon 452 to provide one or more user input fields. Accordingly, the use may enter text using a keyboard connected to the second device 300 (not shown) in one of the user input fields at the second device 300. The user-entered text or characters are transmitted or outputted to the first device 100 to be input to the application active on the first device 100. As characters or text are entered at the second device 300, the data generated at the first device 100 for display on the second device 300 is updated accordingly.

Figure 5C:
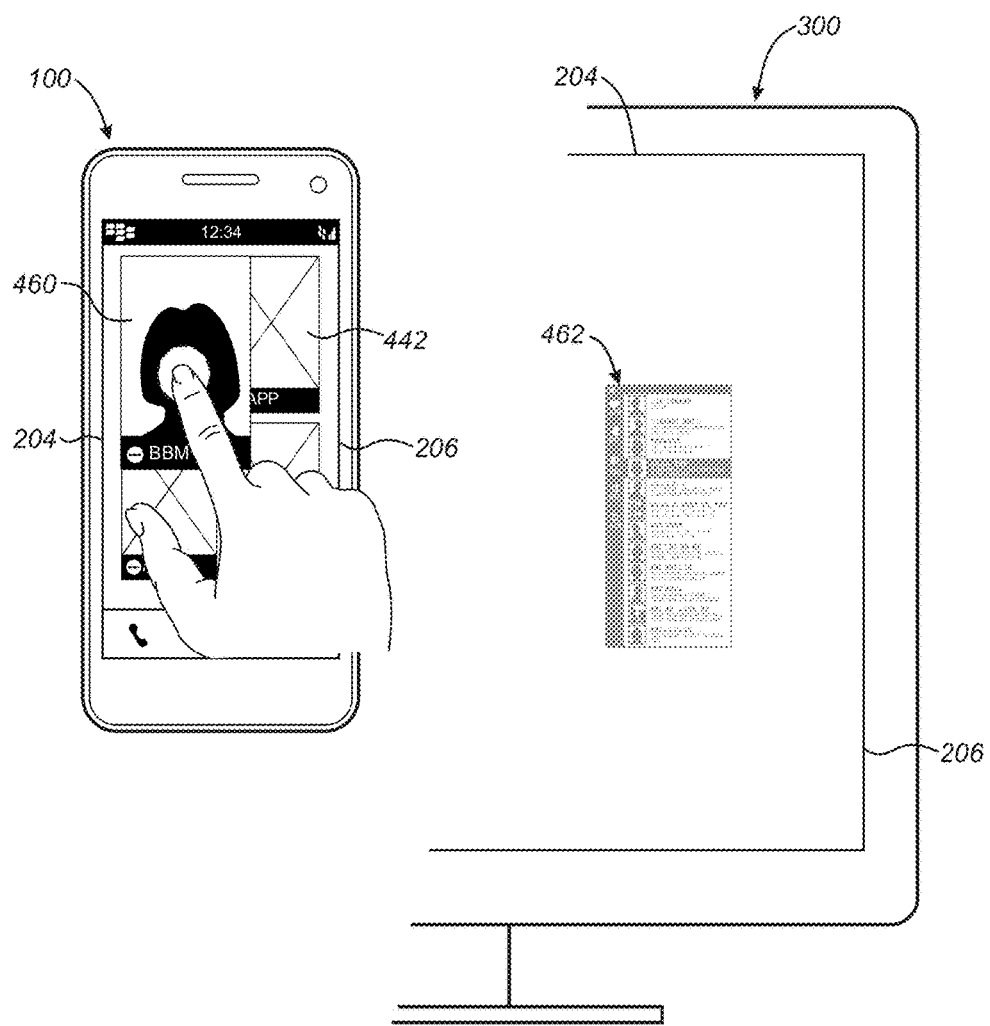

FIG. 5C illustrates the first electronic device 100 and the second electronic device 300 illustrated in FIGS. 5A and 5B, and the same reference numerals are used for like features. In the figure, a user is interacting with the first electronic device 100 while data, generated at the first electronic device 100 is being displayed at the second electronic device 300 associated with an application running on the first electronic device 100. In this example, the user has selected a display icon 460 representing an application which is illustrated in FIG. 5B (display icon 450) as being blended with the second electronic device 300. In this example, the display icon 460 has been altered from the display icon 450, in that the icon is illustrated as a minimised icon. In this example, when a user first selects the display icon 460, the processor 240 of the first device 100 modifies the display data for the first electronic device 100 to update the display icon from the display icon 450 illustrated in FIG. 5B. However, it will be appreciated that this initial transition is optional. Once the processor 240 of the first device 100 receives an input at the first electronic device 100 via the touchscreen 204, for example, in addition to updating the display icon from that shown in FIG. 5B (icon 450) to that illustrated in FIG. 5C (icon 460), the processor 240 of the first electronic device 100 outputs data to the second electronic device 300 to remove the display of the window 454 and display icon 452 illustrated in FIG. 5B. The removal of the window 454 and display icon 452 illustrated in FIG. 5B is shown in the figure by an opaque icon 462. The data output to the second electronic device 300 may be an instruction indicative of not displaying data at the second electronic device such that the message application running on the processor 240 of the second device 300 becomes inactive or stops running. Alternatively, the data may contain an instruction indicative of causing the message application running on the processor 240 of the second device 300 to close, such that the display 204 of the second device 300 no longer includes a display associated with an application active on the first electronic device 100.

Figure 5D:
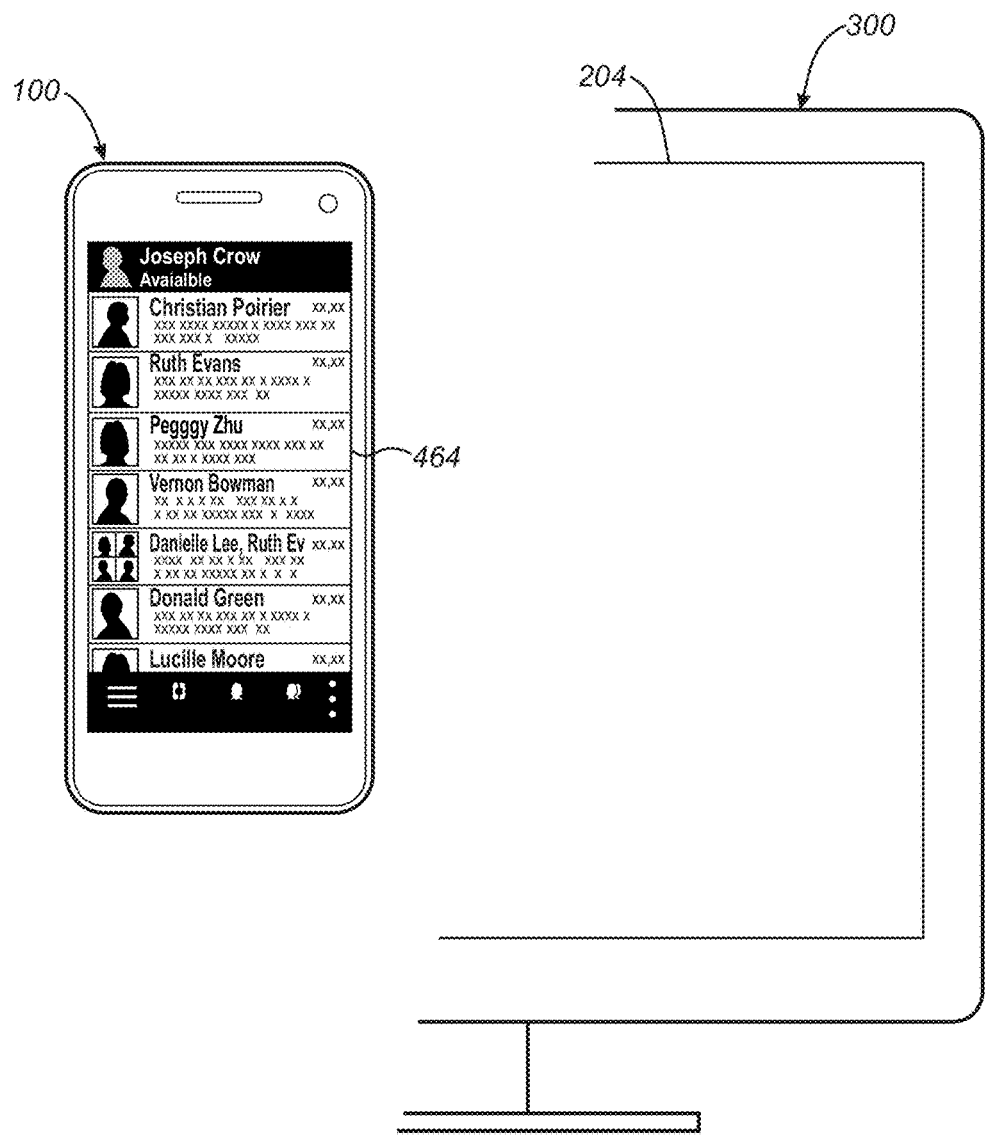

Once the data has been outputted to the second electronic device 300 to stop displaying data associated with the application running on the first device 100, or at the same time, the processor 240 of the first electronic device 100 modifies the data associated with the user selected application. In this example, the data for the first device 100 is modified to provide an expended view of the message application, as illustrated by the display 464 in FIG. 5D. As described above, the user may select display icon 450 illustrated in FIG. 5B which causes data to be generated by the processor of the first device 100 to remove the display from the second device 300 and provide the expanded view illustrated by display icon 464 in FIG. 5D in a single step. As illustrated in FIG. 5D nothing is displayed at the second device 300 after a user input (e.g., event) is detected at the first device 100, associated with the application running on the first device 100.

When the focus (e.g., active display) of the application is moved from the second device 300 to the first device 300, and vice versa, data entered at either device associated with the application running on the first device 100 is also moved. For example, if a user is drafting a message at the second device 300 by entering text or characters at the display object associated with the message application running on the first device 100, and the focus is moved back to the first device 100, when the message application is made active at the first device 100 (e.g., the user is able to enter data when the application is active) data appertaining to the drafted message will be generated at the first device 100 for display on the first device 100. Thus the user can continue drafting the message as the focus is moved between devices. It will be appreciated that this is because the message application for sending/receiving messages, receiving user input and generating display data is running on a single device, which is in this example is the first device 100.

In one example, if a user selects an application at the first device 100, which is different from the application that is currently being displayed at the second device 300, the display at the first and second devices 100, 300 may not be changed. That is to say that in one example, only interaction with the application at the first device 100 that is currently displayed at the second device 300 will cause a change to occur at the second and/or first devices 300, 100. A user input or selection (i.e., event) may include a gesture at first device 100, for example, to move the focus of the application running on the first device 100 back to the first device 100 from the second device 300.

A message or messenger applications has been described herein, but it will be appreciated that other applications may also operate in a similar manner to that described above including, but not limited to, contacts, calendar, and email applications.

In the examples described herein, the displays illustrated at the first and second devices 100, 300 are illustrated to be different, but it will be appreciated that the displays generated by the first device 100 for the first and second devices 100, 300 may be the same, may contain the same information or may relate to the same functional aspects, but be provided in an expanded or reduced form on one or other device (i.e., differ in appearance). In this regard the data for display on the first and second devices 100, 300 will be rendered by the first device 100 to be the same. Furthermore, it will be appreciated that if the same data is output to the display 204 of the first device and output to the second device 300 for display, only one data set is generated and used for display on both the first and second device 100, 300.

In the example described above when a user interacts with an application running on the first device 100, which is currently displayed on the second device 300, data is supplied to the second device 300 to close or shut down the display object 452, including the surround window 454. However, in an alternative example, if the user interacts with the application at the first device 100, the processor 240 of the first device causes the display object on the first device 100 to be expanded, enhanced or maximised, while outputting data to the second device 300 to be reduce, minimise, or diminish the display icon displayed at the second device 300. The display object at the second device 300 may be a display icon or display notification similar to the active frame view illustrated by display icon 440 illustrated in FIG. 5A, or may be a minimised icon at a tool bar, similar to the display icons 446 illustrated in FIG. 5A. That is to say that a display icon or other display notification may be displayed at the second electronic 300 to inform the user that the focus, or control, is at the first electronic device 100. The same can be performed in reverse such that the display icon at the first device 100 is minimised and the display icon at the second device 300 is maximised in response to user input at the second device 300. It is noted that if either display objects at the first or second device 100, 300 are minimised, in response to a user input at the other of the two devices, it may not be possible to enter data or entry of data is deactivated at that device until the display object is maximised again. At the same time, if data entry is deactivated at one or other the two devices, data entry is activated at the other of the two devices.

It will be appreciated that if the connection or communicative coupling between the first and second devices 100, 300 is lost, or terminated, the display object representative of the application active on the first device 100 will be updated to display data at the first device associated with the application, such as that illustrated by display icon 440.

One or more events have been described herein as causing the display data to be generated or modified at either of the first or second devices 100, 300, and these events include, but are not limited to establishing a connection (or communicative coupling) between the first and second devices 100, 300, terminating a connection (or communicative coupling) between the first and second devices 100, 300 and detecting a user input at the first device 100 or the second device 300, for example, to launch a message application on the second device 300.

In the examples described herein, an application on the second electronic device 300 has been executed by a user. However, in an alternative example, an application may already be running or active on the second electronic device 300 that provides the user with a notification in the form of a pop-up icon in response to a message, for example, being received at the first device 100. The icon may appear, for example, at an edge of the display 204 of the second device 300 and may contain information on the received message, such as the message sender. The notification may alternatively, or additionally, include a reminder from a calendar or an email for example. By selecting the notification (which is referred to as an event), the window 454 illustrated in FIG. 5B is opened at the second device 300 and a data signal is transmitted to the first device 100 as described above, to generate data for generating a display icon 452 as illustrated in FIG. 5B at the second device 300.

Figure 6A:
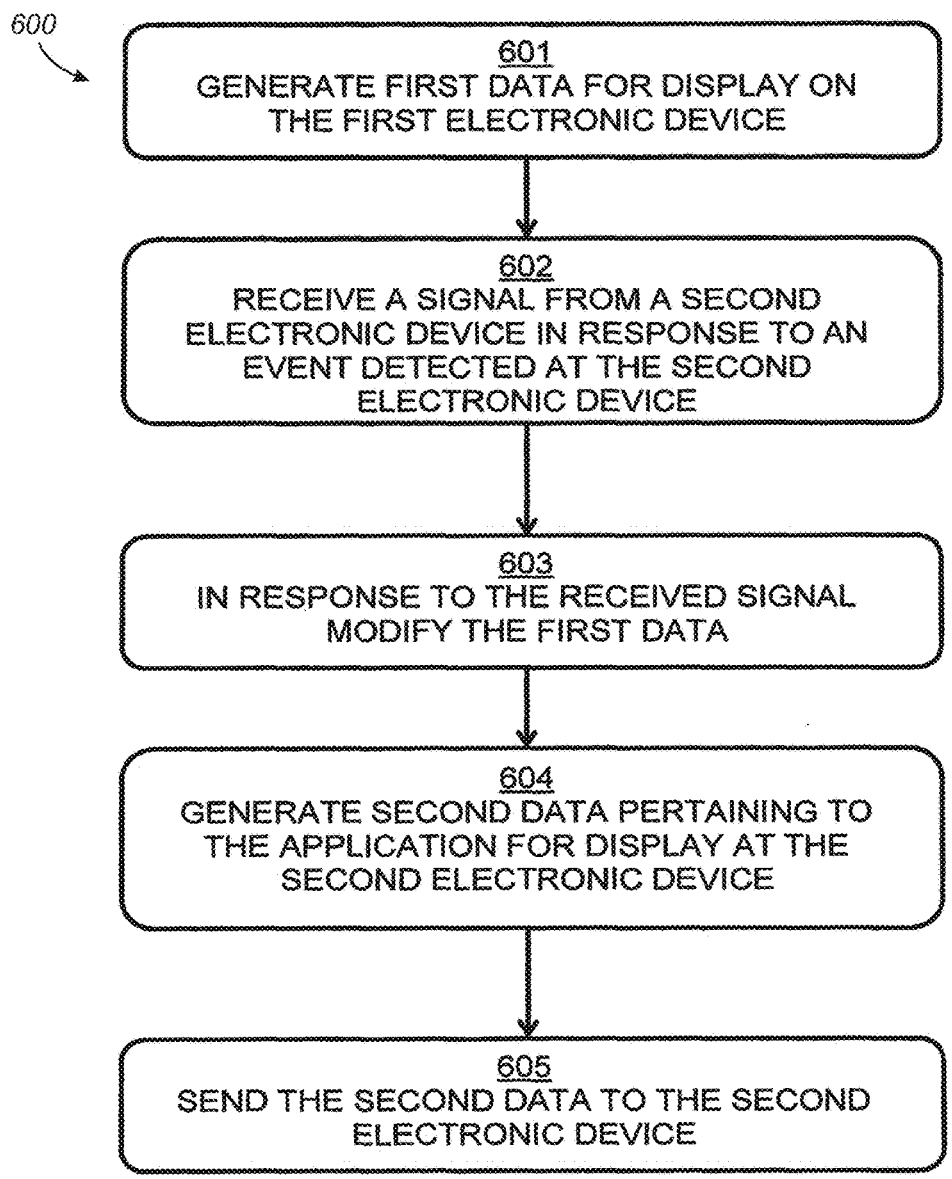
FIG. 6A is a flow chart depicting a method performed by a processor of a first electronic device.

FIG. 6A is a flow chart depicting a method 600 performed by the processor 240 of a first electronic device 100, as described in association with FIGS. 5A to 5E, optionally in conjunction with the method 650 (see below) being performed by the processor 240 of a second electronic device 300 which can be coupled to the first electronic device 100.

At block 601, the processor 240 generates first data for display on the first electronic device pertaining to an application executable on the first electronic device.

At block 602, the processor 240 receives a signal at the first electronic device from a second electronic device in response to an event detected at the second electronic device.

At block 603, in response to the received signal, the processor 240 modifies the first data.

At block 604, the processor 240 generates second data pertaining to the application for display at the second electronic device also in response to the received signal.

At block 605, the processor 240 sends or transmits the second data to the second electronic device, where it can be displayed.

Figure 6B:
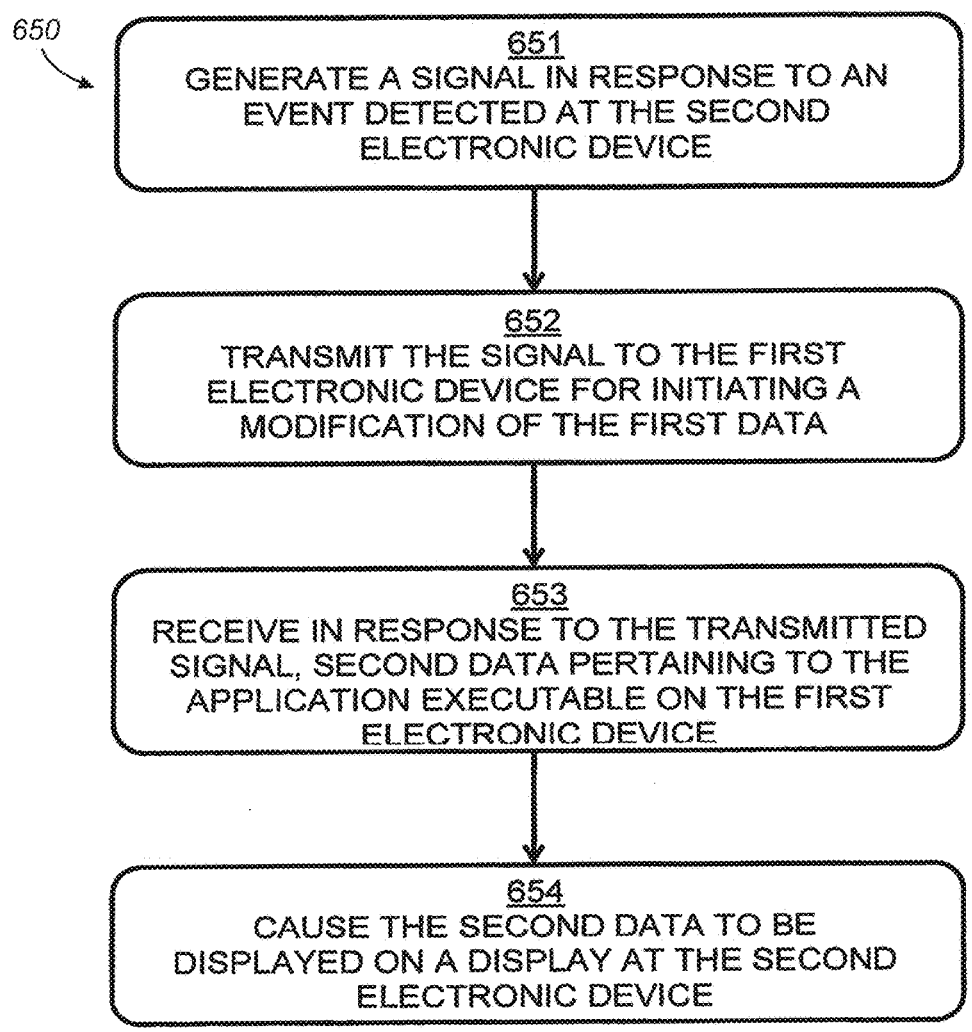
FIG. 6B is a flow chart depicting a method performed by a processor of a second electronic device.

FIG. 6B is a flow chart depicting a method 650 performed by a processor 240 of a second electronic device 300 which is separate to the processor 240 of the first electronic device 100, as described in association with FIGS. 5A to 5E, optionally in conjunction with the method 600 being performed by the processor 240 of a first electronic device 100 which can be coupled to the second electronic device 300.

At block 651, the processor 240 generates a signal in response to an event detected at the second electronic device.

At block 652, the processor 240 transmits the signal to the first electronic device for initiating a modification of the first data.

At block 653, the processor 240 receives from the first electronic device, in response to the transmitted signal, second data pertaining to the application executable on the first electronic device for display on the second electronic device.

At block 654, the processor 240 causes the second data to be displayed on a display at the second electronic device.

While the present application is primarily described in terms of devices and methods (e.g., first and second devices 100, 300), the devices may include components for performing at least some of the example aspects and features of the described methods, be it by way of hardware components (such as the memory 244, 246, 248 and/or the processor 240), software or any combination of the two, or in any other manner. Moreover, an article of manufacture for use with the apparatus, such as a pre-recorded storage device or other similar computer readable medium including program instructions recorded thereon may direct the apparatus to facilitate the practice of the described methods. It should be understood that such apparatus and articles of manufacture come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

It will be appreciated that the foregoing discussion relates to particular embodiments. However, in other embodiments, various aspects and examples may be combined.

The invention claimed is:

1. A method for use at a first electronic device, the first electronic device being communicatively coupled with a second electronic device, the method comprising, at the first electronic device:
   generating first data for display at the first electronic device, the first data pertaining to an application running on the first electronic device;
   displaying the first data at the first electronic device;
   receiving a signal at the first electronic device from the second electronic device in response to a gesture input event detected at the second electronic device, the signal for causing the first electronic device to generate and send application data for display on the second electronic device;
   wherein the first electronic device and the second electronic device are end user computing devices;
   in response to the received signal:
      modifying the first data displayed on the first electronic device to indicate that data input to the application running on the first electronic device is activated at the second electronic device and deactivated at the first electronic device;
      generating second data for display at the second electronic device, the second data pertaining to the application running on the first electronic device and being substantially similar to the first data displayed at the first electronic device; and
      sending the second data to the second electronic device for display on the second electronic device;
   wherein the application is only active on the first electronic device;
   receiving, at the first electronic device, from the second electronic device, user-entered data entered at the second electronic device for initiating a modification of the application data such that the application that is only active on the first electronic device is controlled to perform actions based on user selections at the second electronic device; and
   in response to receiving at the first electronic device, the user-entered data entered at the second electronic device:
      at the first electronic device, updating the application data with the user-entered data to generate:
         updated first data modifying the application at the first electronic device and updated second data; and
         sending the updated second data to the second electronic device for display.

2. The method of claim 1, wherein the detected event is a gesture input event on a display object displayed at the second electronic device, the display object associated with the application active on the first electronic device.

3. The method of claim 1, further comprising:
   in response to receiving a further signal from the second electronic device indicative of a user input associated with the application detected at the second electronic device, the first electronic device deactivating data input to the application on the first electronic device and activating data input pertaining to the application on the second electronic device.

4. The method of claim 3, further comprising:
   in response to detecting a user input associated with the application at the first electronic device, the first electronic device deactivates data input pertaining to the application on the second electronic device and activates data input pertaining to the application on the first electronic device.

5. The method of claim 1, wherein at least one of the first data and the second data comprises data for display of a user-editable field.

6. The method of claim 1, further comprising:
   in response to detecting user input associated with the application at the first electronic device, modifying the second data to cease displaying the second data associated with the application on the second electronic device.

7. The method of claim 1, further comprising:
   modifying the first data, in response to detecting that the first and second electronic devices are decoupled.

8. The method of claim 1, further comprising:
   in response to detecting user input at the first electronic device, modifying the first data pertaining to the application to enhance the display of the first data at the first electronic device; and
   modifying the second data pertaining to the application to diminish the display of the second data at the second electronic device.

9. The method of claim 1, further comprising:
   in response to receiving a further signal from the second electronic device indicative of a user input detected at the second electronic device, modifying the second data pertaining to the application to enhance the display of the first data at the second electronic device; and further modifying the first data pertaining to the application to diminish the display of the first data at the second electronic device.

10. The method of claim 1, wherein the first data for display at the first electronic device comprises data for one or more of generating, modifying, rendering and removing display objects associated with the application on one or both of the first and second electronic devices.

11. The method of claim 1, wherein the second data for display at the second electronic device comprises data for one or more of generating, modifying, rendering and removing display objects associated with the application on one or both of the first and second electronic devices.

12. The method of claim 10, wherein at least one of the display objects for display at the first electronic device is the same, or relates to at least one identical functional aspect of the application, as at least one of the display objects for display at the second electronic device.

13. The method of claim 1, wherein the first electronic device is a wireless communication device and the second electronic device is a computer device.

14. A non-transitory computer-readable medium comprising executable instructions which, when executed, cause a processor to perform a method at a first electronic device, the first electronic device being communicatively coupled with a second electronic device, the method comprising:
generating first data for display at the first electronic device, the first data pertaining to an application running on the first electronic device;
displaying the first data at the first electronic device;
receiving a signal at the first electronic device from the second electronic device in response to a gesture input event detected at the second electronic device, the signal for causing the first electronic device to generate and send application data for display on the second electronic device;
wherein the first electronic device and the second electronic device are end user computing devices;
in response to the received signal:
modifying the first data displayed on the first electronic device to indicate that data input to the application running on the first electronic device is activated at the second electronic device and deactivated at the first electronic device;
generating second data for display at the second electronic device, the second data pertaining to the application running on the first electronic device and being substantially similar to the first data; and
sending the second data to the second electronic device for display on the second electronic device;
wherein the application is only active on the first electronic device;
receiving, at the first electronic device, from the second electronic device, user-entered data entered at the second electronic device for initiating a modification of the application data such that the application that is only active on the first electronic device is controlled to perform actions based on user selections at the second electronic device; and
in response to receiving at the first electronic device the user-entered data entered at the second electronic device:
at the first electronic device, updating the application data with the user-entered data to generate: updated first data modifying the application at the first electronic device and updated second data; and
sending the updated second data to the second electronic device for display.

15. A first electronic device adapted to perform a method for use at the first electronic device, the first electronic device being communicatively coupled with a second electronic device, the method comprising, at the first electronic device:
generating first data for display at the first electronic device, the first data pertaining to an application running on the first electronic device;
displaying the first data at the first electronic device;
receiving a signal at the first electronic device from the second electronic device in response to a gesture input event detected at the second electronic device, the signal for causing the first electronic device to generate and send application data for display on the second electronic device;
wherein the first electronic device and the second electronic device are end user computing devices;
in response to the received signal:
modifying the first data displayed on the first electronic device to indicate that data input to the application running on the first electronic device is activated at the second electronic device and deactivated at the first electronic device;
generating second data for display at the second electronic device, the second data pertaining to the application running on the first electronic device and being substantially similar to the first data displayed at the first electronic device; and
sending the second data to the second electronic device for display on the second electronic device;
wherein the application is only active on the first electronic device;
receiving, at the first electronic device, from the second electronic device user-entered data entered at the second electronic device for initiating a modification of the application data, such that the application that is only active on the first electronic device is controlled to perform actions based on user selections at the second electronic device; and
in response to receiving at the first electronic device the user-entered data entered at the second electronic device:
at the first electronic device, updating the application data with the user-entered data to generate: updated first data modifying the application at the first electronic device and updated second data; and
sending the updated second data to the second electronic device for display.

16. A first electronic device communicatively coupled with a second electronic device in use, the first electronic device comprising:
a display;
processing circuitry configured to execute an application and receive a signal from the second electronic device indicative of a gesture input event detected at the second electronic device, when the first electronic device is coupled to the second electronic device;
wherein the first electronic device and the second electronic device are end user computing devices;
wherein the processing circuitry is further configured to:
generate for display on the display first data pertaining to the application running on the first electronic device;

display the first data on the first electronic device;
receive a signal at the first electronic device from the second electronic device in response to the gesture input event detected at the second electronic device, the signal for causing the first electronic device to generate and send application data for display on the second electronic device;
in response to the received signal:
modifying the first data displayed on the first electronic device to indicate that data input to the application running on the first electronic device is activated at the second electronic device and deactivated at the first electronic device;
generate second data for display at the second electronic device, the second data pertaining to the application running on the first electronic device and being substantially similar to the first data displayed at the first electronic device;
send the second data to the second electronic device for display on the second electronic device, when the first electronic device is coupled to the second electronic device;
receive, at the first electronic device, from the second electronic device user-entered data entered at the second electronic device for initiating a modification of the application data such that the application that is only active on the first electronic device is controlled to perform actions based on user selections at the second electronic device; and
in response to receiving at the first electronic device the user-entered data entered at the second electronic device:
at the first electronic device, update the application data with the user-entered data to generate: updated first data modifying the application at the first electronic device and updated second data; and
send the updated second data to the second electronic device for display;
wherein the application is only active on the first electronic device.

17. The first electronic device of claim 16, wherein the processing circuitry is further configured to:
modify the first data displayed on the first electronic device to indicate that the data input to the application running on the first electronic device is activated at the second electronic device; and
modify the second data in response to an event detected at the first electronic device.

18. The first electronic device of claim 16, wherein the detected event is a gesture input event on a display object displayed at the second electronic device, the display object associated with the application active on the first electronic device.

19. The first electronic device of claim 16, wherein the processing circuitry is further configured to, in response to receiving a further signal from the second electronic device indicative of a user input associated with the application detected at the second electronic device, deactivate data input pertaining to the application on the first electronic device and activate data input pertaining to the application on the second electronic device.

20. The first electronic device of claim 16, wherein the processing circuitry is further configured to, in response to a user input associated with the application detected at the first electronic device, deactivate data input pertaining to the application on the second electronic device and activating data input pertaining to the application on the first electronic device.

21. The first electronic device of claim 16, wherein at least one of the first data and the second data comprises data for display of a user-editable field.

22. The first electronic device of claim 16, wherein the processing circuitry is further configured to, in response to receiving user input associated with the application at the first electronic device, modify the second data to cease displaying the second data associated with the application on the second electronic device.

23. The first electronic device of claim 16, wherein the processing circuitry is further configured to, modify the first data, in response to detecting that the first and second electronic devices are decoupled.

24. The first electronic device of claim 16, wherein the processing circuitry is further configured to, in response to receiving user input associated with the application at the first electronic device, modify the first data pertaining to the application to enhance representation of the first data on the display at the first electronic device; and
modify the second data pertaining to the application to diminish representation of the second data on the display at the second electronic device.

25. The first electronic device of claim 16, wherein the processing circuitry is further configured to, in response to receiving a further signal from the second electronic device indicative of a user input associated with the application detected at the second electronic device, modify the second data pertaining to the application to enhance representation of the second data on the display at the second electronic device and further modify the first data pertaining to the application to diminish representation of the first data on the display at the second electronic device.

26. The first electronic device of claim 16, wherein the first data for display at the first electronic device comprises data for one or more of generating, modifying, rendering and removing display objects associated with the application on one or both of the first and second electronic devices.

27. The first electronic device of claim 16, wherein the second data for display at the second electronic device comprises data for one or more of generating, modifying, rendering and removing display objects associated with the application on one or both of the first and second electronic devices.

28. The first electronic device of claim 26, wherein at least one of the display objects for display at the first electronic device is the same, or relates to at least one identical functional aspect of the application, as at least one of the display objects for display at the second electronic device.

29. The first electronic device of claim 16, wherein the first electronic device is a wireless communication device and the second electronic device is a computer device.

30. A method for use at a second electronic device, the second electronic device being communicatively coupled with a first electronic device adapted to generate first data for display at the first electronic device pertaining to an application running on the first electronic device, the method comprising, at the second electronic device:
generating a signal at the second electronic device in response to a gesture input event detected at the second electronic device;
transmitting the signal to the first electronic device, the signal for causing the first electronic device to generate and send application data for display on the second electronic device;

wherein the first electronic device and the second electronic device are end user computing devices;
receiving from the first electronic device, in response to the transmitted signal, second data for display at the second electronic device, the second data pertaining to the application running on the first electronic device;
displaying the second data on a display at the second electronic device; and
in response to receiving user input, sending the user input to the first electronic device for updating the first data, such that the application that is only active on the first electronic device is controlled to perform actions based on user selections at the second electronic device;
wherein the application is only active on the first electronic device.

31. The method of claim 30, wherein the second data is displayed at the second electronic device within an application executed on the second electronic device.

32. The method of claim 30, further comprising:
receiving modified second data in response to an event detected at the first electronic device.

33. The method of claim 30, wherein the detected event is associated with the application.

34. The method of claim 30, further comprising: in response to detecting user input associated with the application at the second electronic device, activating data input pertaining to the application on the second electronic device, and deactivating data input pertaining to the application on the first electronic device.

35. The method of claim 30, further comprising: in response to detecting user input associated with the application at the first electronic device, deactivating data input pertaining to the application on the second electronic device and activating data input pertaining to the application on the first electronic device.

36. The method of claim 30, wherein the second data comprises data for display of a user-editable field on the display at the second electronic device.

37. The method of claim 30, further comprising:
removing the display associated with the application from the second electronic device in response to receiving user input associated with the application at the first electronic device and generating modified second data which is received at the second electronic device.

38. The method of claim 30, further comprising:
modifying, in response to detecting that the first and second electronic devices are decoupled, the first data.

39. The method of claim 30, further comprising:
modifying, in response to detecting user input associated with the application at the first electronic device, the second data pertaining to the application to diminish representation of the second data on the display at the second electronic device, and further modifying the first data pertaining to the application to enhance representation of the first data on the display at the first electronic device.

40. The method of claim 30, further comprising:
modifying, in response to detecting user input associated with the application at the second electronic device, the second data to enhance the display at the second electronic device pertaining to the application, and further modifying the first data to diminish the display at the second electronic device pertaining to the application.

41. The method of claim 30, wherein the second data for display at the second electronic device comprises data for one or more of generating, modifying, rendering and removing display objects associated with the application on one or both of the first and second electronic devices.

42. The method of claim 41, wherein at least one of the display objects for display at the first electronic device is the same, or relates to at least one identical functional aspect of the application, as at least one of the display objects for display at the second electronic device.

43. The method of claim 30, wherein the first electronic device is a wireless communication device and the second electronic device is a computer device.

44. A non-transitory computer-readable medium comprising executable instructions which, when executed, cause a processor to perform a method at a second electronic device, the second electronic device being communicatively coupled with a first electronic device adapted to generate first data for display at the first electronic device pertaining to an application running on the first electronic device, the method comprising:
generating a signal at the second electronic device in response to a gesture input event detected at the second electronic device, the signal for causing the first electronic device to generate and send application data for display on the second electronic device;
transmitting the signal to the first electronic device;
wherein the first electronic device and the second electronic device are end user computing devices;
receiving from the first electronic device, in response to the transmitted signal, second data for display at the second electronic device, the second data pertaining to the application running on the first electronic device;
displaying the second data on a display at the second electronic device; and
in response to receiving user input, sending the user input to the first electronic device for updating the first data associated with the application, such that the application that is only active on the first electronic device is controlled to perform actions based on user selections at the second electronic device;
wherein the application is only active on the first electronic device.

* * * * *